INVENTOR:
EVERETT W. LANDON
BY
Mellin and Hanscom
ATTORNEYS

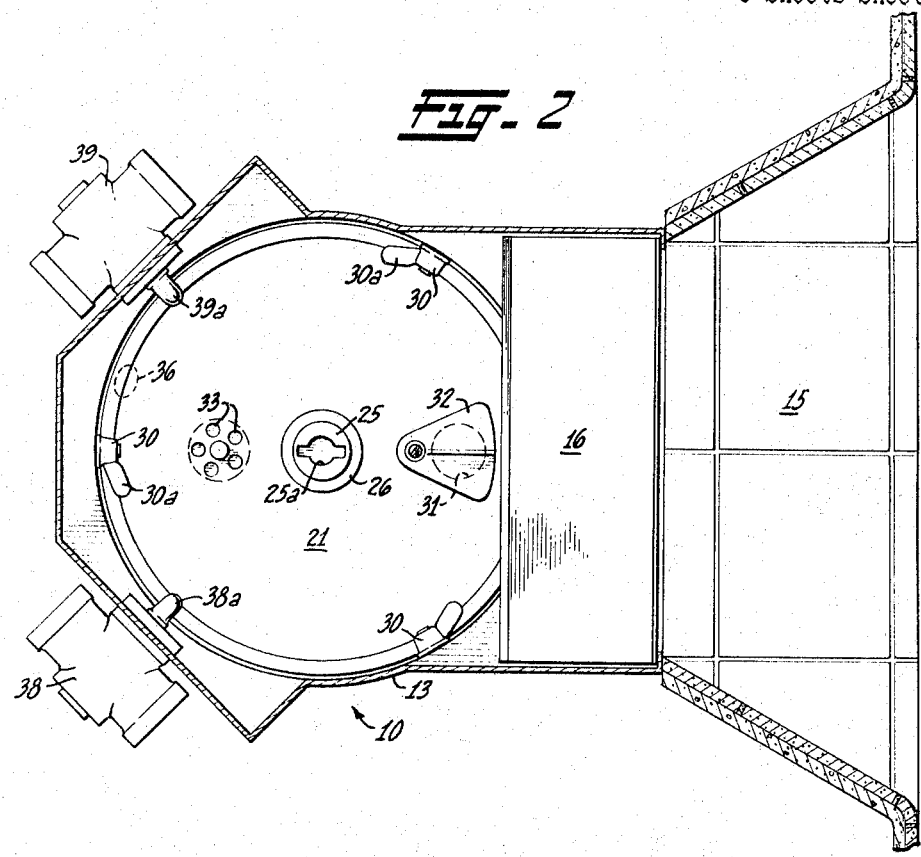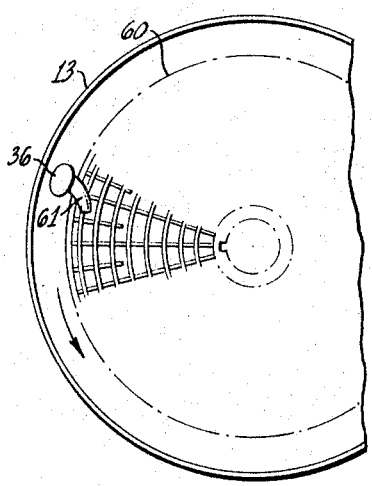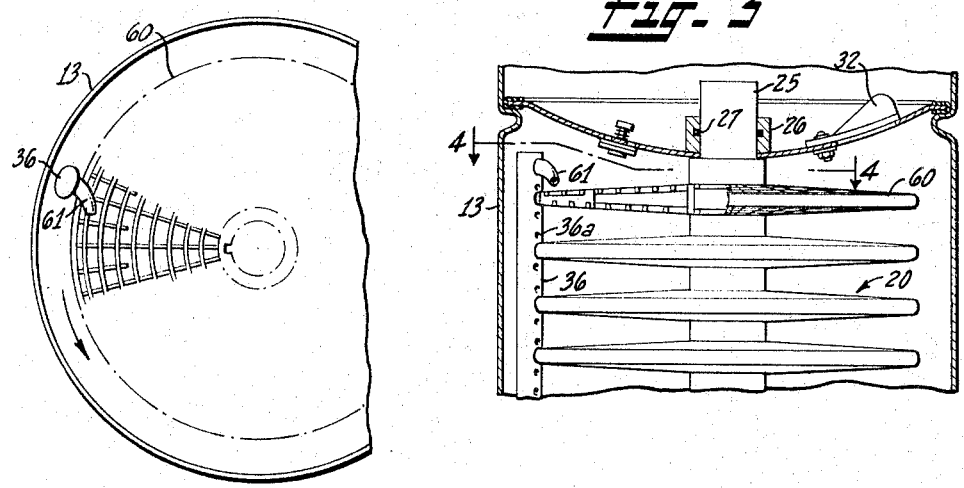

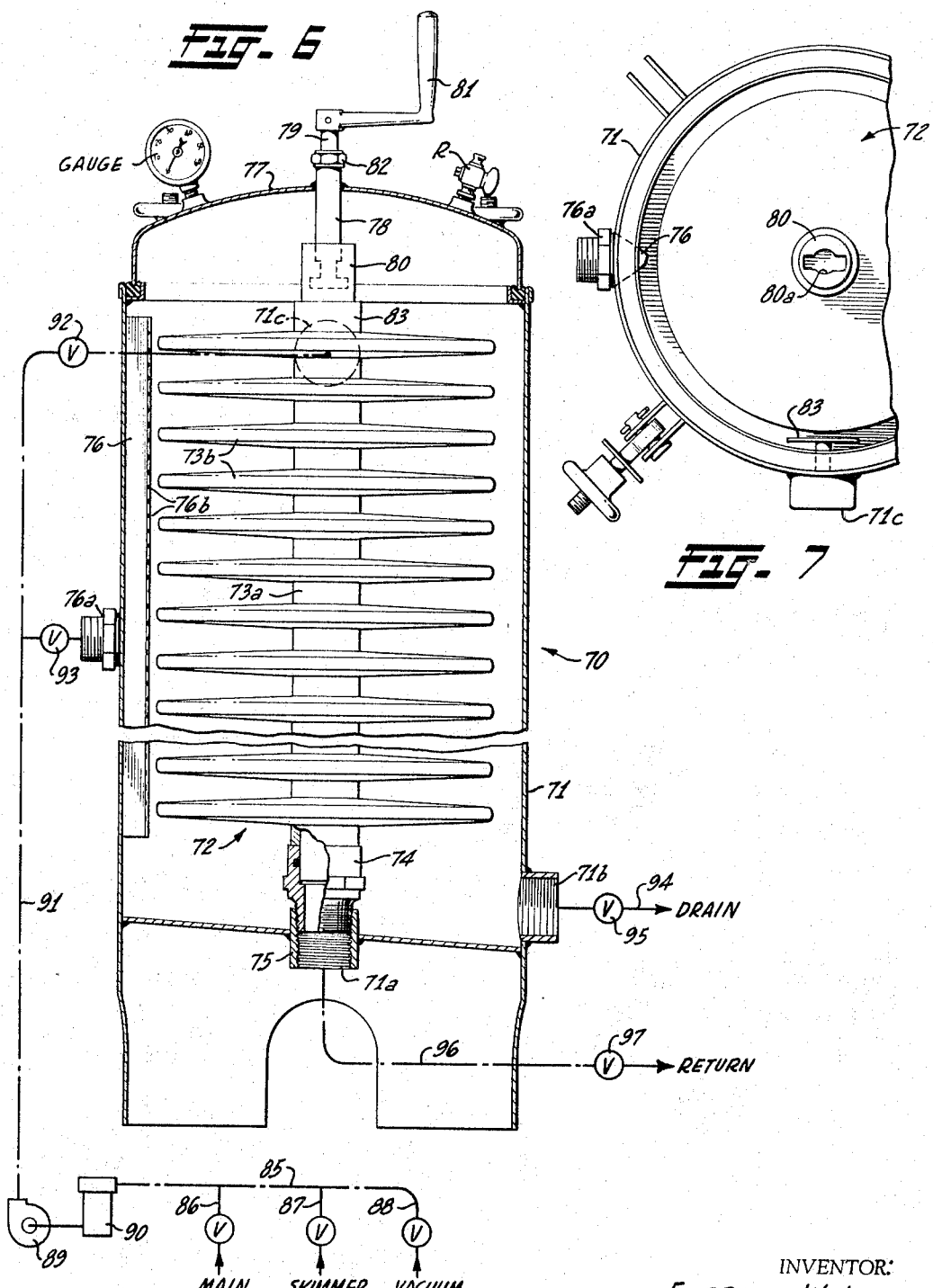

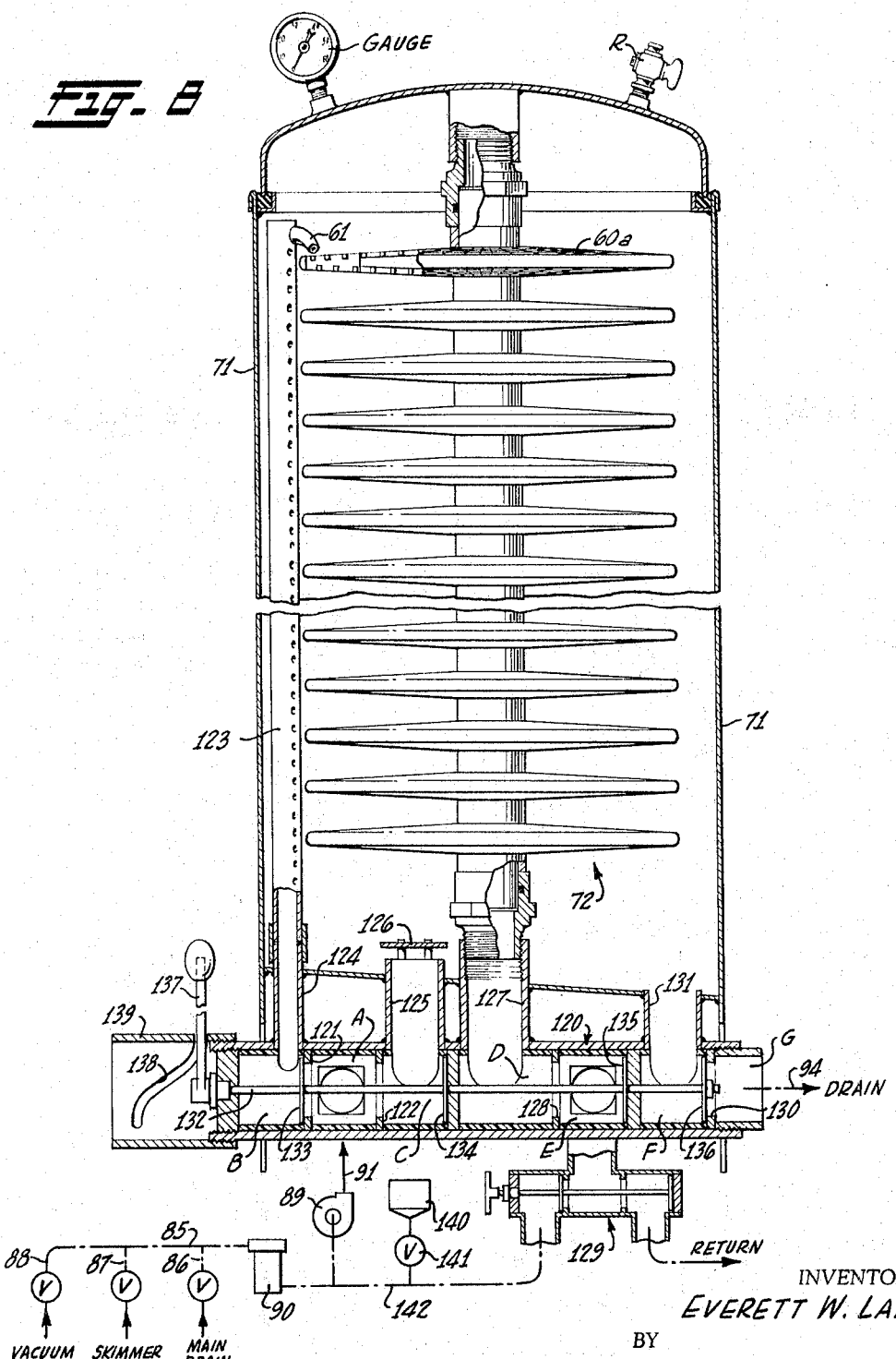

United States Patent Office 3,297,163
Patented Jan. 10, 1967

3,297,163
JET-WASHED ROTATABLE FILTERS
Everett W. Landon, San Mateo, Calif., assignor to Landon, Inc., North Hollywood, Calif., a corporation of California
Continuation of application Ser. No. 146,748, Oct. 23, 1961. This application May 6, 1965, Ser. No. 456,894
3 Claims. (Cl. 210—331)

This application is a continuation of my co-pending application Serial No. 146,748, filed October 23, 1961, now abandoned.

This invention relates to filtering devices for swimming pools and the like, and more particularly involves filter structures having a rotatable filter element that may be cleaned by a stationary jet stream without requiring a separation of the filter element from its tank or housing.

In brief, this invention comprises a filtering tank having a filter element rotatably mounted upon a fixed axis and including means for jetting a stream of water against said filter element while it is being rotated. It is contemplated that such a structure has particular value in connection with swimming pools and the like, where it is extremely desirable that the filter element be easily cleaned. Moreover, the invention further teaches novel arrangements of apparatus, including connections, for incorporating the more basic concept of a jet-cleaned rotatable filter into a skim-filter device, as well as more conventional types of pressure-filtering units.

To more fully understand the significance of the present invention, it should be realized that most filtering devices require periodic maintenance and cleaning; and many filtering devices can only be cleaned by the complete removal of the filtering element from its filter tank or housing. Those devices having filters that must be removed for cleaning are regarded by many as objectionable, since it requires manual handling and, especially, since the manual disassembly and cleaning of these units may involve contact with dirt and slime, making periodic maintenance and cleaning an obnoxious chore. Thus, although many devices which utilize removable filters may have outstanding advantages, the requirement that there be manual handling of the filter element tends to militate against those advantages. Obviously, it would be of great importance if the need of removing a filter element for cleaning could be obviated without impairing operation or depriving it of inherent basic advantages.

In view of the following detailed description it will be seen that the present invention contemplates and teaches a skim-filter unit having a filter element rotatably mounted upon a fixed axis through which filtered water may be withdrawn from the filter housing. This structure and the additional use of control apparatus in connection therewith has been instrumental in producing a filtering device of particular importance and utility in connection with swimming pools. Also, it will be evident that the concept of a rotatable filter element with means for jetting a stream of water against said element may be usefully adapted to a conventional pressure-type filter unit.

This invention is to be distinguished and contrasted with prior art filtering structures which merely swirl or spin the filter element in a bath, as used in the teaching of U.S. Patent No. 2,538,575. Nor is this invention to be confused with the idea of using an impinging jet stream for cleaning a relatively-fixed filter element as disclosed in U.S. Patent No. 2,609,101.

A primary object of this invention is to provide a filter structure for swimming pools comprising a filtering tank having a fluid inlet, a filtering element disposed in said tank and rotatably mounted therein upon a vertical axis, said filtering element having a fluid outlet coaxial with said axis of rotatable mounting, means within said housing for jetting a stream of water in a direction toward said filtering element and substantially normal to said vertical axis, means in fluid communication with the fluid outlet of said filtering elements for withdrawing filtered water from said tank, and conduit means fluidly communicating with the interior of said tank and exteriorly of said filter element for removing waste fluids.

Another object is to provide a filter structure of the kind described and including a manually-operated crank shaft for rotating the filtering element as a pressurized jet stream is directed thereagainst.

It is another object of this invention to provide a filter structure of the kind described, and further including an impeller member secured to the filtering element and a nozzle device for directing a water jet against said impeller member, thereby rotating the filtering element.

A further object is to provide a filter structure of the kind described including a filtering element having a plurality of filter plates mounted concentrically in axially-spaced relation along a tubular filter core, and further including an elongate jet manifold having a plurality of jet openings directed toward respective portions of the filter core and plates.

A still further object of this invention is to provide a filter-skimming structure for swimming pools comprising a collector tank having an open top and an inlet branch adapted to be placed in communication with the surface water in a pool, a surface skimming device in said inlet branch, a filtering element disposed in said tank below the level of said skimming device and rotatably mounted therein upon a vertical axis, said filtering element having a fluid outlet coaxial with said axis of rotatable mounting, means in fluid communication with the fluid outlet of said filtering element for withdrawing filtered water from said tank, means within said tank for jetting a stream of water in a direction toward said filter element and substantially normal to said vertical axis, shut-off means disposed in said tank between said inlet branch and said filter element for preventing fluid passage therebetween, and conduit means fluidly communicating with the interior of said tank and exteriorly of said filter element for removing waste fluids.

Another object is to provide a filter-skimming structure of the kind described, and further including a pump, first valve means for connecting the vacuum of said pump to either the fluid outlet of said filter element or to a vacuum fitting in a pool, and a second valve means for connecting the discharge side of said pump to either a pool return or to said jetting means.

Another object is to provide a filter-skimming structure of the kind described and including connections as immediately above provided, wherein the first and second valve means each comprise a piston-type valve having a common vertical rod member that may be operated by a handle proximate to the top of said tank, each of said piston-type valves being axially aligned and having a pair of axially-spaced valve seats and including a valve element disposed therebetween the valve element of each piston-type valve being attached to said rod member and simultaneously actuated by its operation.

A still further object is to provide a filter structure for swimming pools of the kind described, utilizing a closed pressurized filter tank.

And yet another object of the invention is to provide a filter structure for swimming pools comprising a closed pressurized filter tank, a filter element disposed in said tank and rotatably mounted therein upon a fixed vertical axis, said filter element having a fluid outlet coaxial with said axis of rotatable mounting, means within said housing for jetting a stream of water in a direction toward said filter element and substantially normal to said axis; a valve-control device comprising a cylindrical manifold horizontally disposed subjacent to said tank, said manifold being transversely separated into a plurality of axially aligned chambers and having a valve-operating rod extending therethrough, a first chamber of said manifold adapted for being connected to a pump, second and third chambers formed on opposite sides of said first chamber and separated therefrom by first and second valve seats respectively, valve means mounted upon said rod and complementary to said first and second valve seats for placing said first chamber in fluid communication with either said second or said third chambers, said second chamber being fluidly connected to said jetting means and said third chamber being fluidly connected to the interior of said tank, a fourth chamber of said manifold being fluidly connected to the fluid outlet of said tank, a fifth chamber adjacent to said fourth chamber and separated therefrom by a third valve seat, said fifth chamber adapted for being connected to a pool return line, valve means mounted upon said rod and complementary to said third valve seat for placing said fourth and fifth chambers in fluid communication upon operation of said rod to a position placing said first chamber in fluid communication with said third chamber, a sixth chamber of said manifold being fluidly connected to the interior of said tank adjacent its bottom, a seventh chamber adjacent to said sixth chamber and separated therefrom by a fourth valve seat, said seventh chamber adapted for being connected to a drain, and valve means mounted upon said rod and complementary to said fourth valve seat for placing said sixth and seventh chambers in fluid communication upon operation of said rod to a position placing said first chamber in fluid communication with said second chamber.

Other objects of this invention will become apparent in view of the following detailed description and especially in view of the accompanying drawings.

In the drawings forming a part of this application and in which like parts are identified by like reference numerals throughout the same, FIG. 1 is a vertical center section of a skim-filter tank embodying the present invention, illustrating most parts in elevation and showing diagrammatic connections for its operation;

FIG. 2 is a plan view of the skim filter as observed along lines 2—2 in FIG. 1 and with its leaf basket removed;

FIG. 3 is a vertical section of a portion of a modified form of skim-filter unit having an impeller member mounted to its rotatable filtering element;

FIG. 4 is a partial horizontal section and plan view of the skim-filter modification shown in FIG. 3, taken on lines 4—4 and illustrating the relationship of the impeller member and nozzle;

FIG. 6 is a vertical center section of a pressurized filter tank having incorporated therein many features of the present invention;

FIG. 7 is a partial plan view of the filter tank of FIG. 6 having its top cover removed; and FIG. 8 is a vertical center section of another pressurized filter tank embodiment of this invention.

Figure 1:
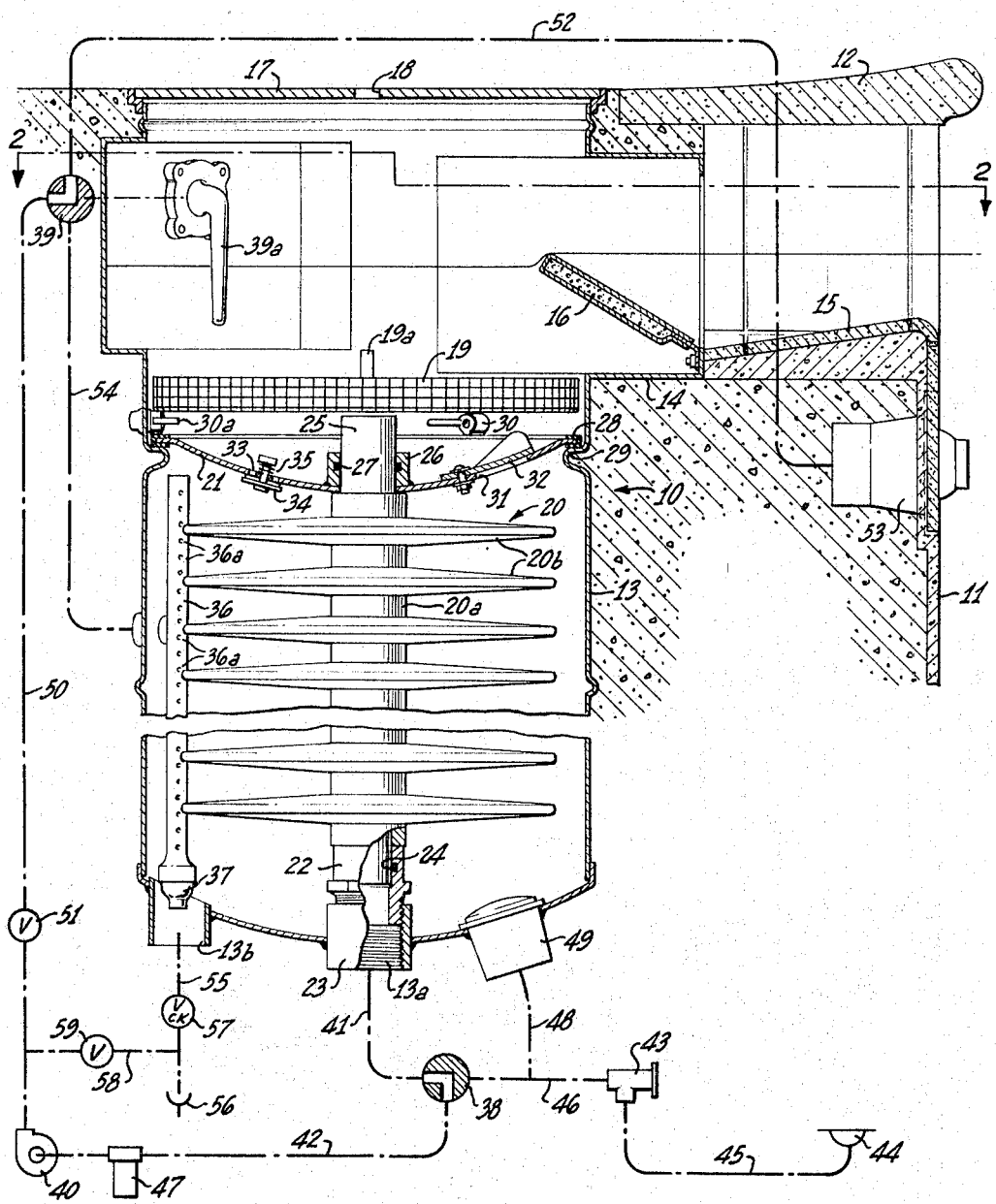

Referring to FIGS. 1 and 2, there is shown a filter-skimmer device 10 mounted in proximity to a pool having a side wall 11 and a surface coping 12. The filter-skimmer 10 comprises a filter collector tank 13 (or filter housing) having a bottom filtering outlet 12a, a drain port 2b and including an upper branch inlet 14 that extends laterally and opens into a passageway 15 through side wall 11. In a conventional manner the lower surface of branch 14 is positioned below the normal surface level of the pool, and a skimmer device comprising a pivotally mounted weir 16 allows water and debris to flow into the lower region of tank 13. The upper end of tank 13 is open, but is provided with a removable cover 17 having a finger grasp hole 18. A leaf basket 19 having a handle 19a is also utilized.

Filter-skimmer 10 also includes filter element 20 having a tubular core 20a and a plurality of disc members 20b, said members being arranged concentrically on said core and being spaced axially apart. In accordance with the particular teaching of the present invention filter element 20 is, more especially, rotatably mounted upon a vertical axis between the bottom of tank 13 and a shut-off plate 21.

The lower end of core 20a is open and fluidly communicates with an adapter 22 threadedly connecting to a discharged sleeve 23 and outlet 13a of tank 13; and adapter 22 is formed with an internal groove that contains an O-ring sealing member 24. The upper end of core 20a is closed off by a concentric mounting mandrel 25, said mandrel being received in a sleeve 26 of shut-off plate 21. The upper end of mandrel 25 is formed with an axial crank socket 25a, allowing a crank shaft to be mated therewith from above for rotating the filter element 20. A second O-ring member 27 is utilized to provide a fluid seal between mandrel 25 and sleeve 26.

It will be also noted that plate 21 includes a peripheral sealing ring 28 which rests upon a circumferential indentation 29 of tank 13. Indentation 29 supports the plate 21 below the bottom surface of branch 14 and three angularly spaced and pivotally mounted eccentric lugs 30, having crank arms 30a, hold plate 21 into sealing engagement with said indentation. Basket 19 may rest upon the lugs 30, as shown.

Plate 21 is formed with an opening 31, through which water from above may drain into the bottom portion of tank 13. However, opening 31 may be closed off by a flap valve 32 pivotally mounted on plate 21. A number of small vent openings 33 are also provided in plate 21, but these openings are normally closed by a spring-pressed check valve 34 having a spring member 35. It will be evidenced that check valve 34 will be opened should the pressure force above plate 21 exceed the combined forces of the internal pressure of tank 13 below plate 21 and the closing force of spring 35. Thus, valve 34 provides a vacuum relief for the filter retaining portion of tank 13.

The novel filter skimmer 10 also includes means for cleaning the filter element by jetting a stream of water against the filtering element as it is rotated. For this purpose a jet manifold 36 extends vertically along the inside surface of tank 13 and positioned opposite core 20a and filter plates 20b. Manifold 36 contains a plurality of jet openings 36a aimed generally toward the filter element, but preferably off of center so as to direct a jet stream against the filter core and disc members with a glancing blow. It has been found that the cleaning action of the jet streams will be particularly effective when the filter element is rotated in opposition to the natural impelling action of the jet streams.

Manifold 36 is also disposed directly above drain port 13b, and a jet nozzle 37 is adapted for discharging a stream into the drain port. This structure serves as an aspirator for applying an exhaust pressure within the filtering tank.

Filter-skimmer 10 is adapted to be used in a system including valves and connections that provide means for draining tank 13, cleaning filter 20 with water from a pool, draining dirty water from tank 13 during the cleaning operation and then connecting the filter-skimmer 10 for normal filtering operation. These functions are essentially controlled by the two three-way valves 38 and 39, both mounted to tank 13 and having operated handles 38a and 39a respectively, accessible immediately beneath cover plate 17, best shown in FIG. 2.

Valve 38 may be operated into either one of two positions. In one position of operation filter discharge sleeve 23 is connected to the vacuum side of a pump 40 through fluid conduits 41 and 42; and in its other position, valve 38 connects a pool fitting 43 and a main drain 44 through conduits 45 and 46 to the conduit 42. A strainer 47 is preferably connected into conduit 42 to prevent foreign matter for entering the pump. A fluid passageway 48 having a normally closed check valve 49 allows one-way fluid communication from conduit 46 into tank 13, for a purpose to be described.

Valve 39, similar to valve 38, may also be operated into either one of two positions. In the position shown in FIG. 1, a fluid connection is made from the discharge side of pump 40 through pump discharge conduit 50 to a conduit 52 having a shut-off valve 51, said conduit 52 terminating at an inlet fitting 53 mounted in pool wall 11. Valve 39 may also be positioned so as to connect the pump discharge conduit 50 to the jet manifold 36 via conduit 54.

A conduit 55 is also provided, that connects drain outlet 13b of tank 13 with a sump 56 through a check valve 57 which is biased closed. Valve 57 will be opened to allow wash water to pass from tank 13 to sump 56 when the discharge pressure exerted by nozzle 37 exceeds the closing bias force of the valve. This closing bias force should be sufficient to retain a full complement of water within the tank without leaking during filtering operation. Valve 57, it will be seen, is designed to open only during a filter cleaning operation.

A fluid connection 58 is provided intermediate pump discharge conduit 50 and conduit 55, said connection having a shut-off valve 59. When and if the pool is to be completely drained, valve 51 would be closed and valve 59 opened, but under normal operating conditions of either filtering or cleaning, valve 51 would be open and valve 59 closed.

The normal operation of the above described embodiment will be best understood in view of FIG. 1. As shown, the filter-skimmer device 10 is conditioned for filtering, and upon energization of pump 40 the water in tank 13 will be exhausted through outlet 13a. As the water level in tank 13 falls below the surface level of water in passageway 15, weir 16 will pivot downwardly, allowing water and debris to enter branch 14 from the pool. Large objects are caught up in basket 19 but the relatively unfiltered and silt-containing water passes into the bottom portion of tank 13 through opening 31 in shut-off plate 21, flap valve 32 being open. The water is then filtered through element 20, conducted out sleeve 23 and along conduits 41, 42, 50 and 52, and finally discharged back into the pool through one or more pool inlets 53.

Under normal filtering conditions when it is desired to skim and filter the surface water of the pool, very little, if any, water will pass from the vacuum fitting 43 or main drain 44 through check valve 49 into tank 13. However, if the pump 40 should be turned on at a time when the water in the pool is relatively low, and if water does not enter the tank via branch 14 (or does not enter sufficiently fast to maintain some water in the tank) then the hydrostatic pressure in the pool will force water through the main drain 44, conduits 45 and 46 and check valve 49. This will insure that some fluid will occupy the tank, preventing starvation of the pump and a resulting air lock. Of course, hydrostatic pressure might also force pool water into the tank from vacuum inlet 43, but this inlet is normally sealed by a conventional plug, not shown.

In the event that the skim filter is to be used in a vacuuming operation, the flap valve 32 is manually closed, after removal of cover 17 and basket 19. Very little of the water above shut-off plate 21 will now pass into the bottom portion of the tank and, accordingly, pump 40 will apply a vacuum pressure thereto. A conventional hose fitting, like that shown and described in U.S. Patent No. 2,701,235, is connected to the vacuum fitting 43, said hose fitting placing the hose in fluid communication with conduit 46, but effectively sealing off conduit 45. Thus, the vacuum pressure of tank 13 is only applied to the hose. Valve 49 is now fully opened by the combined hydrostatic pressure of the pool and the vacuum pressure, allowing water to pass into the tank and be filtered, the filtered water again being removed through outlet 13a and then returned to the pool through fitting 53. It will be seen that valve 34 provides a vacuum relief in case the pressure within the bottom chamber of tank 13 becomes excessive, as might occur if conduit line 48 were plugged. This relief action prevents damage to the filter tank or to any of its parts.

If desired, the vacuum action obtained by closing flap valve 31 can also be applied to the main drain merely by using the conventional vacuum plug. Since no water can then be drawn into conduit 46 through the pool opening of fitting 43 the vacuum pressure is fully transmitted to line 45 and the main drain 44.

Now, after a period of filtering operation, it will become necessary to clean the filtering element 20. To condition the filter-skimmer for filter cleaning, valves 38 and 39 are reversed from their filtering positions, thereby placing conduits 46, 42, 50 and 54 in fluid communication. Flap valve 32 is then placed over opening 31, thereby preventing a flow from the top side of plate 21 into the bottom portion of tank 13. Since conduit lines 41 and 48 are closed off by valve 38 and check valve 49, respectively, all fluid leaving tank 13 must necessarily pass out through outlet 13b. Therefore, upon energizing pump 40, water from the main drain will be forced into jet manifold 36 under pressure, resulting in a jet stream discharge against the filtering element 20. As this is happening, the filter element is slowly rotated by means of a conventional crank, which is keyed to the slot 25a from above shut-off plate 21. The discharge of pressurized water from nozzle 37 into drain port 13b functions as an aspirator for removing the wash water from tank 13 and discharging water through valve 57 into sump 56.

Under certain conditions large quantities of dirt and sediment may collect in a swimming pool, especially in areas bordering the main drain. Rather than filter this material out through the filter element 20, using the normal filtering and water re-cycling connections, it is of some advantage that sub-surface water bearing large quantities of sediment should be discharged into a sump as waste. If such waters were passed through the filtering element 20, more frequent cleanings would be necessary without effectuating much of a cost savings in waters that might well be discarded.

It will be evident that in the filtering system shown in FIG. 1 the waters taken in from vacuum fitting 43 and main drain 44 during filter cleaning could instead be discharged directly to the sump 56. Under conditions such as outlined in the preceding paragraph it would be desirable to close valve 51 and open valve 59. Then, with valve 38 conditioned for transmitting fluids from line 46 to conduit line 42, the water obtained through fitting 43 (and/or drain 44) would be discharged rather than recycled. Normally, if a large quantity of sediment were to be removed from the bottom or sides of a pool, a vacuum hose would be utilized conjunctively with the fitting 43; and the conduit line 45 leading from drain 44 would be closed by the conventional hose fitting. But it will be evidence that whenever the pool is to be emptied, fitting 43 should be plugged; then an exhaust pressure would be maintained at the bottom of the pool until all water in the pool had been discharged in the sump 56.

FIGS. 3 and 4 of the drawings illustrate a modification in the filter-skimmer shown in FIGS. 1 and 2. The essential and only difference between this embodiment and the one which has been described is in the additional incorporation of an impeller member 60 and a cooperating jet nozzle 61 extending from manifold 36. Whereas the first embodiment utilized a filter element that was manually rotated during its cleaning, the impeller member 60 and nozzle 61 will perform this function automatically. Nozzle 61 is oriented for directing a jet stream against the blades of impeller 60, said impeller consisting of an uncovered framework of a disc member 206. Although various types of impellers could be used, it has been discovered that the structural framework of a conventional filter disc member will suitably operate as an impeller, said framework comprising a plurality of radiating blades 60a. In view of this fact, it will be evident that no special parts need be provided for equipping a standard filter element 20 with an impeller; it is only necessary to uncover the framework of the top-most filter disc member 206 and insert an axial plug into the filter core 20a. The chief advantage of such a construction, in addition to obvious savings in cost of parts, is the expedient manner of providing a rotatable type filter element 20 with an impeller member.

Figure 5:
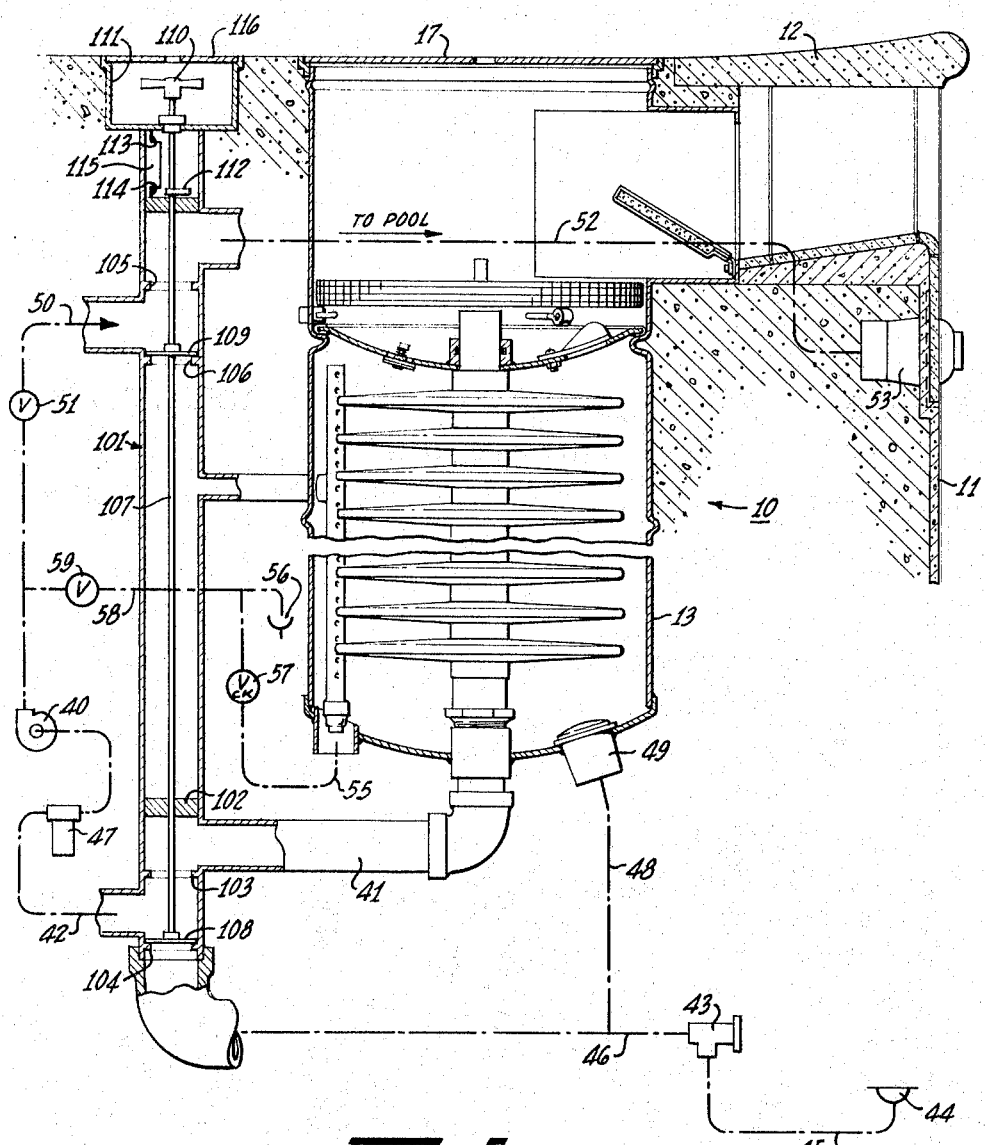
FIG. 5 is a vertical center section of another embodiment of the invention as used with a skim-filter tank.

FIG. 5 illustrates a further discovery in connection with a skim-filter unit that may be jet-cleaned. This embodiment distinguishes from the embodiment of FIGS. 1 and 2 by the novel form and arrangement of valve mechanism, allowing the filter elements 20 to be jet cleaned by the mere actuating of a single operating rod having a handle located proximate to the top of tank 13.

More particularly, a pair of piston-type valves are provided by a cylindrical valve housing 101 having an interior partition 102, and valve seats 103, 104, 105 and 106. A valve actuating rod 107 extends axially through housing 101 and is provided with valve elements 108 and 109 disposed intermediate valve seats 103, 104 and 105, 106, respectively. Rod 107 is also provided with a handle 110 at its upper end, said handle being accessible from within a well box 111 disposed proximate to the top of tank 13. A radial finger member 112 is attached to rod 107 for cooperative engagement with vertically spaced slots 113 and 114 formed in a sleeve 115.

It will be evident that finger member 112 serves to retain rod 107 in either of its vertical valve operating positions when said finger is engaged with one of the slots of sleeve 115. The rod may be reciprocally moved, however, by merely rotating handle 110 so as to remove finger 112 from confinement within the slots of the sleeve.

A removable cover plate 116 may be used over the well box 111 to conceal the valve operating handle from sight, if desired.

Valve housing 101 is connected to the filtering apparatus in a manner which permits of an operation identical to that of apparatus shown in FIG. 1. The valve means defined by valve seats 103, 104 and valve element 108 is, in effect, a substitute for valve 38 of the earlier described embodiment; and valve seats 105, 106 and valve element 109 replace valve 39. The mode of operation, therefore, is exactly the same as before and the same conduit connections may be utilized.

FIGS. 6 and 7 illustrate a pressurized filter device 70 that incorporates a rotatable filter element similar to the ones previously described. Filter device 70 comprises an upright cylindrical tank 71 including a filter element 72 rotatably mounted within said tank upon a vertical axis. Element 72 comprises a tubular core 73a and a plurality of filter discs 73b. Core 73a is open at its bottom end, which fluidly communicates with an outlet opening 71a formed in tank 71, as provided through an adapter 74 and a sleeve 75. A jet manifold 76 is mounted upon the inner wall of tank 71 having an external connection 76a and a plurality of jet openings 76b for directing jet streams against the filter core 73a and discs 73b. The upper end of tank 71 is closed by a removable lid 77 having a mounting sleeve 78 for a crank shaft 79. In FIG. 6, crank shaft 79 is shown with a crank slot 80a, formed in a mandrel 80 that seals off the upper end of filter core 73. A crank arm 81 is keyed to shaft 79; and a packing seal 82 allows shaft 79 and filter element 72 to be rotated while tank 71 is maintained under pressure. In addition to the filtering outlet 71a, tank 71 also provides a drain port 71b and an inlet port 71c. Inlet port 71c is guarded by a baffle plate 83 that distributes incoming fluid into various regions of tank 13.

Tank 71 is provided with a pressure gauge and a relief valve R, permitting observance and control of the pressure within.

In further view of FIG. 6 it will be noted that filter device 70 is adapted to be used in a filtering system for pools, said system comprising a manifold line 85 having conduit leads 86, 87 and 88 coming from a main drain fitting, a surface skimmer device and a vacuum fitting, respectively. Each of the conduit leads 86, 87 and 88 is provided with a shut-off valve which is opened whenever that particular line is to conduct fluid from its fitting or device. Manifold line 83 is connected to the inlet side of a pump 89 but the fluid conveyed is first passed through a strainer 90. The discharge side of pump 89 may feed water under pressure through conduit 91 into either the filter inlet 71c or the jet manifold connection 76a, the specific action being dependent upon the condition of shut-off valves 92 and 93. The drain outlet 71b is connected to a drain line 94 through a shut-off valve 95 while the filtering outlet communicates with a pool return line 96 through a valve 97.

In normal filtering use of device 70, any one of the lines 86, 87 or 88 may be opened, depending upon the type of cleaning action desired. The water discharged from pump 89 is then conducted into tank 71 through valve 92 (valve 93 being closed), and filtered water is expelled under pressure through outlet 71a and returned to the pool through conduit 96 (valve 95 being closed).

When the filter element 72 is to be cleaned, valve 95 is opened and valve 97 is closed; valve 93 is also opened while valve 92 is closed; and wash water is preferably drawn through either line 86 or 88 and introduced into the jet manifold 72. During cleaning, the filter element 72 is rotated by means of crank arm 81 and the wash water is carried out the drain line 94.

In carrying out the cleaning of filter element 72 it is preferable to first empty tank 71 of its fluid contents. This will allow the jet streams issuing from manifold 76 to impinge against the filter element with greater cleaning force. Accordingly, before pressurized water is directed into manifold 76, valve 95 and relief valve R are opened while the pump 89 is inactive. After the water has been drained from tank 71, pressure is applied by initiating the pump 89.

Following the cleaning operation, both valves 95 and 97 are closed and the tank is refilled to operating capacity; then valve R is closed and valve 97 is opened for a filtering operation.

FIG. 8 represents a further improvement in a pressurized jet cleaned filter unit. It will be evident that this improved structure utilizes a jet-driven impeller disc 60a similar to the arrangement shown in FIGS. 3 and 4, and also provides a rod-controlled valve manifold for directing the fluid flows into and from the pressurized filter tank 71. The structure shown more particularly comprises a cylindrical manifold 120 which is axially divided into a plurality of chambers by valve seats and divider partitions.

A first chamber A is formed intermediate a second chamber B and a third chamber C by a pair of valve seats 121 and 122. Chamber A fluidly connects with conduit line 91, previously described in connection with the embodiment of FIGS. 6 and 7; chamber B is connected to a vertical jet manifold 123 by a short vertical lead 124; and chamber C communicates with the interior of tank 71 through a short vertical lead 125. A baffle plate 126 is supported directly over the opening into the tank to distribute incoming water with a minimum amount of directional force.

Manifold 120 is also divided into a fourth chamber D, connected to the coaxial outlet of tank 71 and filter element 72 by a short vertical lead 127. Chamber D is axially separated from a fifth chamber E by a valve seat 128, chamber E being connected to a three-way piston-type valve 129.

Additionally, the cylindrical manifold 120 contains sixth and seventh chambers, F and G respectively, which are separated by a valve seat 130. A short vertical lead 131 fluidly connects chamber F with the interior bottom portion of tank 71, while chamber G may be coaxially connected to the drain line 94, as previously described.

It will be noted that a valve rod 132 extends axially through each of the chambers of manifold 120 and a plurality of valve elements are secured to said rod and, accordingly, movable therewith; a valve element 133 is disposed within chamber B movable into engagement with valve seat 121; a second valve element 134 within chamber C cooperates with valve seat 122; a third valve element 135 mates with seat 128; and a fourth valve element 136 complements valve seat 130. Each of the valve elements shown in FIG. 8 occupies its normal position when the apparatus is connected for a filtering operation. However, if rod 132 should be moved toward the left by the camming movement of an operating lever 137 along the angular slot 138 of a collar 139, then the entire filtering apparatus will be organized and fluidly connected for jet cleaning filter element 72.

It will be evident that the embodiment of FIG. 8 represents an ideal filtering structure for use with swimming pools; the entire system is exceedingly compact and conveniently arranged to be controlled by the operation of the single lever 137. The fluid connections 91 and 94 are identical to those used with the embodiment of FIG. 6 and if desired, chamber E could be connected to the simplified pool return system, as previously described. However, the use of valve 129 allows an introduction of precoat material from a slurry supply 140 through a valve 141 and line 142, and then into line 91 through pump 89. Moreover, this arrangement permits a continuous recycling of the precoat-containing fluid in order to properly establish the filtering cake deposited on filter element 72. It will be understood that the conventional piston-type valve 129 is shown in a condition for returning filtered water from chamber E to a pool return, but would be operated to its other position during precoating of the filter element.

Although several preferred embodiments of this invention have been shown and described, it will be apparent that various modifications or changes may be made without departing from the spirit of this invention or the scope of the attached claims, and each of those modifications or changes is contemplated.

Having thus described my invention, what I claim and desire to secure by Letters Patent is:

1. A filter structure for swimming pools comprising: a closed pressurized filter tank, a filter element disposed in said tank and rotatably mounted therein on a fixed axis, said filter element including a hollow filter core having a plurality of filter plates having convex outer surfaces mounted concentrically thereon in axially spaced relationship therealong, means to rotate said filter connected to said filter core, said filter element having fluid outlet coaxial with said axis of rotatable mounting, means within said housing for directing a stream of water in a direction impinging on said filter plates with a glancing action, said water directing means comprising an elongate jet manifold disposed in spaced parallel relationship with said axis of said filter element and having a plurality of openings directed toward said filter core and filter plates at angles displaced from radii of said axis to produce said glancing action, means in fluid communication with said filter core for conducting filtered water from said tank, and means fluidly communicating with the interior of said tank exteriorly of said filter element for introducing unfiltered water and for removing waste fluids, said last named means including a first passageway for introducing water into said tank, a second passageway for withdrawing waste water from said tank, a pump valve means for alternatively connecting the discharge side of said pump to said first fluid passageway and to said water directing means, and valve means for alternatively opening said means communicating with the fluid outlet of said filter element and said second passageway and alternatively closing said outlet and said second passageway.

2. The filter structure of claim 1 wherein said means to rotate said filter includes a crank mounting sleeve, said sleeve being disposed coaxial with the fixed mounting axis of said filter element, and a crankshaft extending through said sleeve and engaged with an end of said filter element, and means for pressure sealing said crankshaft in said sleeve.

3. The filter structure of claim 1 and further including a baffle plate disposed in the filter tank in front of the inlet opening of said first passageway.

References Cited by the Examiner

UNITED STATES PATENTS

| | | | |
|---|---|---|---|
| 582,403 | 5/1897 | Stifel | 210—106 X |
| 650,563 | 5/1900 | Morris | 210—391 X |
| 1,502,700 | 7/1924 | Vallez | 210—347 X |
| 2,790,461 | 4/1957 | Lightfoot et al. | 210—169 X |
| 3,019,905 | 2/1962 | Baker et al. | |
| 3,069,014 | 12/1962 | Lewis | 210—169 |

FOREIGN PATENTS 49,245  10/1889  Germany.

REUBEN FRIEDMAN, *Primary Examiner.*

F. W. MEDLEY, *Assistant Examiner.*